Nov. 20, 1934. S. N. GUNDLACH 1,981,695
SHINGLE CUTTER
Filed Dec. 26, 1931 2 Sheets-Sheet 1
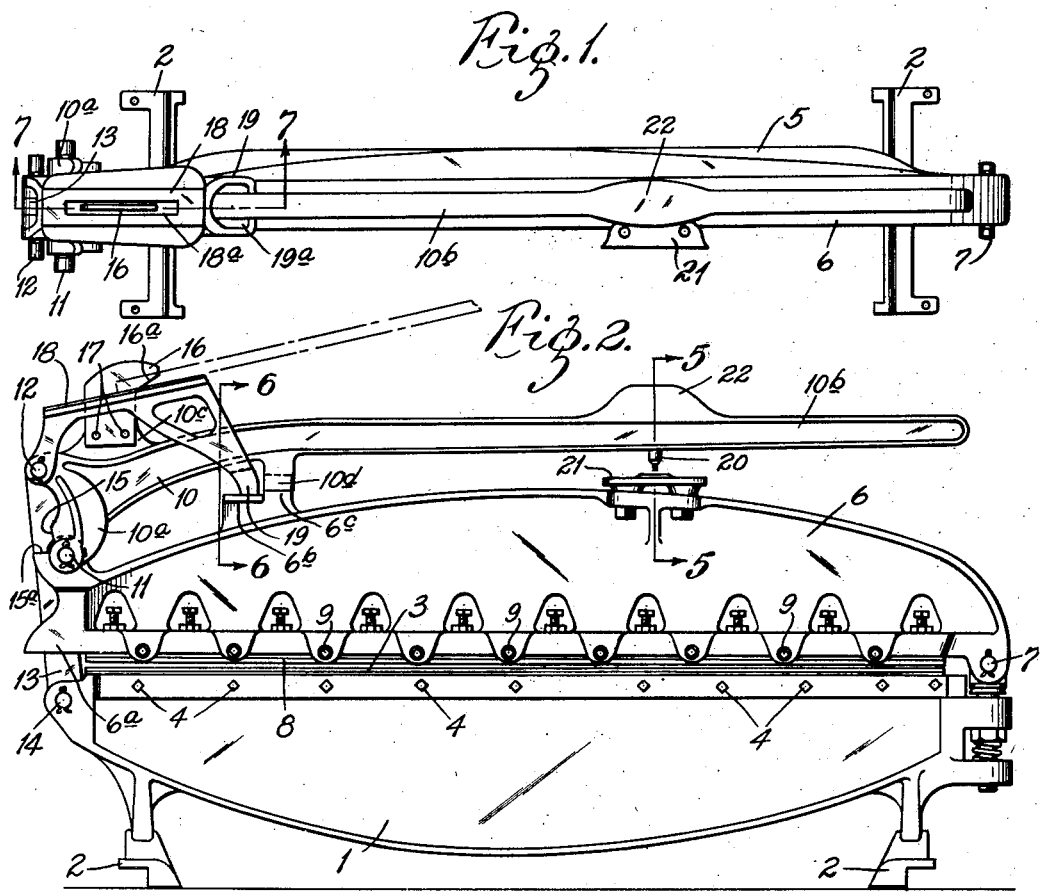
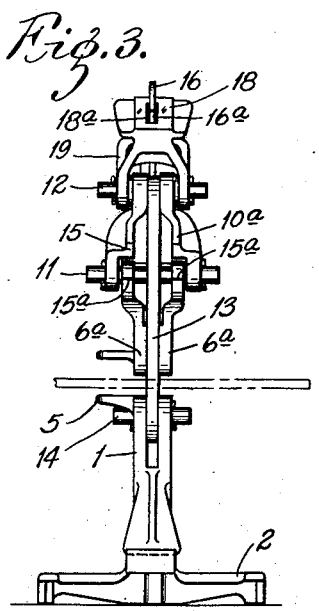
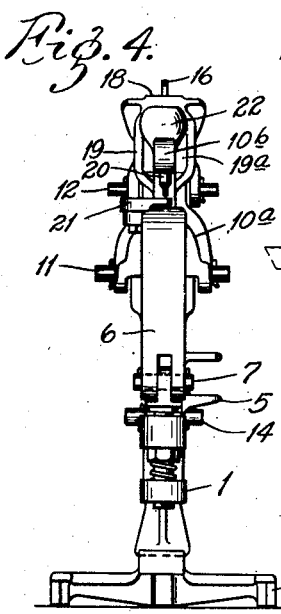
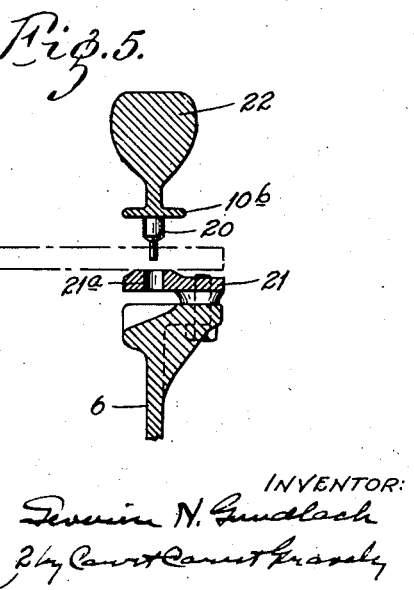
INVENTOR:
Severin N. Gundlach
HIS ATTORNEYS.

Nov. 20, 1934.  S. N. GUNDLACH  1,981,695
SHINGLE CUTTER
Filed Dec. 26, 1931   2 Sheets-Sheet 2
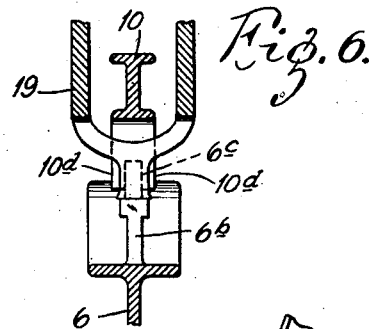
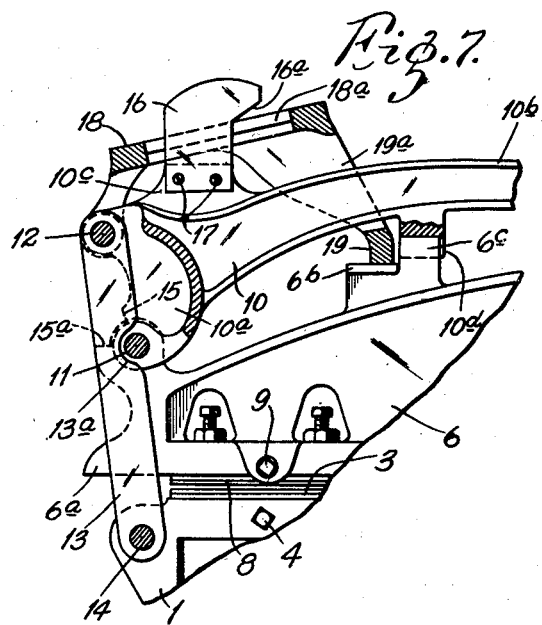
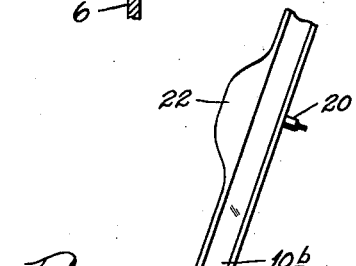
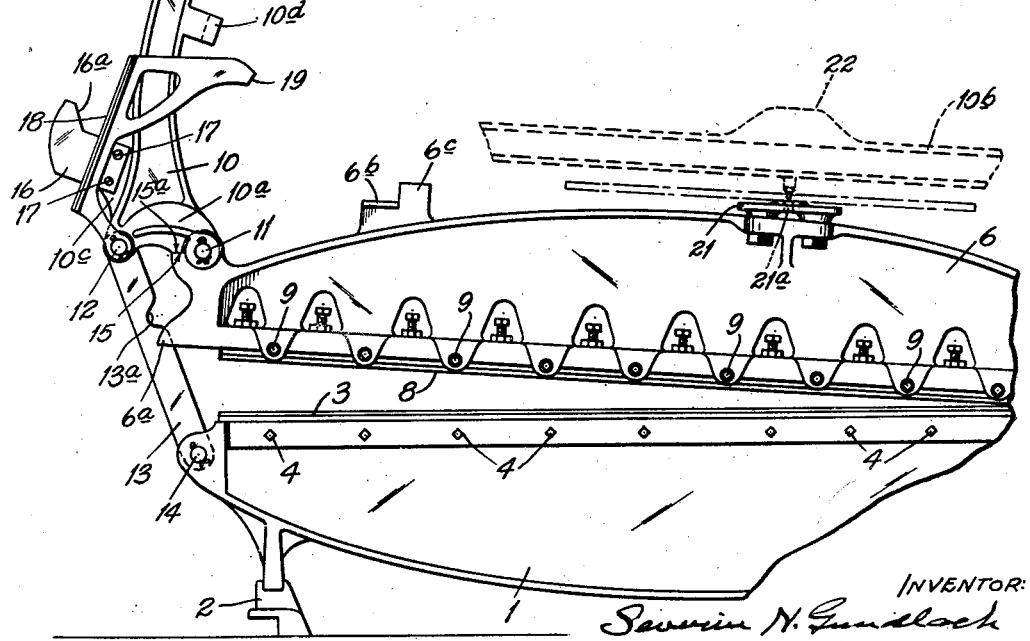
INVENTOR:
Severin N. Gundlach
by Carnot Carnot Gravely
HIS ATTORNEYS Patented Nov. 20, 1934

1,981,695

UNITED STATES PATENT OFFICE 1,981,695

SHINGLE CUTTER

Severin N. Gundlach, Belleville, Ill., assignor to Specialty Tool Manufacturers, Inc., Belleville, Ill.

Application December 26, 1931, Serial No. 583,365

13 Claims. (Cl. 164—44)

This invention relates to cutting devices, particularly portable shingle cutters of the type shown in my Patent No. 1,814,151, dated July 14, 1931. The principal object of the present invention is to devise additional or supplemental cutting means for notching the shingles; to provide for the operation of such means by the operating lever for the main cutting means; to provide means operated by said operating lever for punching holes in the shingles; and to provide for ease of operation, simplicity and cheapness of construction and compactness of design. The invention consists in the shingle cutter and in the construction, combinations and arrangements of parts hereinafter described and claimed.

In the accompanying drawings, which form part of this specification and wherein like symbols refer to like parts wherever they occur.

Fig. 1 is a plan view of a shingle cutter embodying my invention,

Fig. 2 is a side elevation thereof,

Fig. 3 is a view looking at one end of said cutter,

Fig. 4 is a view looking at the opposite end thereof,

Fig. 5 is a fragmentary vertical cross-section on the line 5—5 in Fig. 2,

Fig. 6 is a fragmentary vertical cross-section on the line 6—6 in Fig. 2,

Fig. 7 is an enlarged vertical longitudinal section on the line 7—7 in Fig. 1; and Fig. 8 is a view similar to Fig. 2, showing the pivoted knife carrier in raised position.

The present cutting device is particularly adapted for use in trimming and notching asbestos shingles, although it may be used for other purposes. Said cutting device comprising a stationary main body member 1 provided near its opposite ends with laterally extending foot flanges 2 that extend far enough on opposite sides of said body member to hold the same in upright position. The stationary body member 1 of the shingle cutter is provided along its top with a longitudinal groove adapted to receive a knife blade 3, which projects above the upper edge of said member and is provided with a cutting edge. This knife blade 3 is removably secured in the groove by means of set screws 4. The body member 1 is provided along one side with a laterally extending flange portion 5 which serves as a support for the shingle being cut.

Located above the body member 1 of the cutter is a knife carrier 6 that is pivotally supported, as at 7, at one end of said body member for vertical swinging movement towards and away from the stationary knife blade 3 located therebelow. Mounted in a longitudinal groove on the underside of the pivoted knife carrier 6 is a knife blade 8 which is provided along its lower edge with a cutting edge disposed directly above the stationary lower knife blade 3. The upper knife blade 8 is removably secured by means of set screws 9 in the groove provided therefor in the lower edge of the pivoted carrier 6.

The pivoted knife carrier 6 is raised and lowered by means of a bent lever 10 having a short arm 10a pivotally secured by means of a horizontal pivot pin 11 to the free end of said knife carrier and having a long arm 10b constituting an operating handle. Said lever is fulcrumed on a horizontal pin 12 on the upper end of a vertically disposed link 13, whose lower end is secured to the adjacent end of the stationary main body portion 1 of the cutter by means of a horizontal pivot pin 14. The lever 10 is provided adjacent to the fulcrum pin 11 with abutment surfaces 15 adapted to cooperate against similar abutment surfaces 15a on the knife carrier 6 and thus limit the upward swinging movement of the latter and the operating arm of said lever. The free end of the knife carrier is also provided with a pair of outstanding lugs 6a adapted to straddle the lever supporting link 13 and thus maintain the upper knife blade 8 in alinement with the lower knife blade 3.

The cutting device is provided with an additional or supplemental cutting means comprising a knife 16 that is removably secured by screws 17 to an upstanding lug 10c on the operating arm 10b of the lever adjacent to the fulcrum pin 12 therefor, and has a hook-shaped upper end portion provided on the underside of the hook with a cutting edge 16a. The hook-shaped knife 16 extends upwardly through an elongated slot 18a provided therefor in the top of a table 18, which is pivotally supported at one end on the fulcrum pin 12 for the lever. The table 18 at the other end is provided with a leg 19 adapted, in the lowered position of the operating arm of the lever 10, to rest upon a lug 6b provided therefor on the upper surface of the pivoted knife carrier 6. The length of the leg 19 of the table 18 is such that, in the lowered position of the operating arm of the lever 10, the top of said table is tilted towards the fulcrum of said lever and is located just below the cutting edge 16a of the knife 16 in the operating arm thereof. The leg 19 at the free end of the table 18 is provided with a vertically elongated opening or slot 19a adapted to receive the operating arm of the lever and permit limited movement of said arm without moving said table vertically. The operating arm of the lever 10 is provided on its underside with spaced lugs 10d adapted, in the lowered position of said arm, to straddle an upstanding lugs 6c on the knife carrier 6 and thus prevent side play of said handle with respect to said carrier. The lug 6c also serves as a stop for limiting the downward swinging movement of the operating arm of the lever 10.

The shingle cutter is provided with means for punching a nail hole in a shingle. As shown in the drawings, said means comprises a punch 20 that projects from the lower edge of the operating arm 10b of the lever 10 and is adapted to cooperate with a hole 21a provided therefor in a shingle supporting bracket 21 that is removably secured to the upper edge of the pivoted knife carrier 6. The arm of the lever 10 is provided adjacent to the punch member 20 with an enlarged portion 22 adapted to increase the weight of the arm so that the punching may be performed merely by dropping said arm. The upper surface of the enlarged portion 22 is preferably made flat to form an anvil, whereby the punching operation may also be performed by striking said surface with a hammer or other implement.

When it is desired to trim the margins of the shingle or to cut through the body of the shingle from margin to margin thereof, the shingle is placed between the main knife blades 3 and 8 and the long operating arm 10b of the lever 10 is swung downwardly to make the cut. When, however, it is desired to notch the shingle, said arm is lowered and the shingle is placed upon the table 18 with its edge beneath the cutting edge 16a of the knife 16 and the cut is made by raising and lowering said arm in the opening 19a in the leg 19 of the table while feeding the shingle towards said knife.

It is noted that the auxiliary cutting device is particularly advantageous in notching shingles to fit them around dormers, chimneys and openings in roofs as well as windows, doors and other openings in walls. The loose connection between the leg 19 at the free end of the table 18 and the operating arm of the lever 10 permits such notches to be made without lifting said table, whose free end slides back and forth upon the lug 6b during the movement of said arm. It is also noted that very little movement is imparted to the pivoted knife carrier during the operation of the auxiliary cutting device. It is also noted that the table top slopes upwardly away from the operating arm of the lever, whereby said arm may be operated during the notching operation without striking the shingle supported on said table.

Obviously, the hereinbefore described device admits of considerable modification without departing from the invention. Therefore, I do not wish to be limited to the precise construction shown and described.

What I claim is:

1. A shingle cutter having a main cutting means comprising a stationary knife and a pivoted knife, a swinging arm for operating said pivoted knife, and a supplemental notching knife solely supported on and swinging with said operating arm.

2. A shingle cutter having a main cutting means comprising a stationary knife and a pivoted knife, a lever fulcrumed on said shingle cutter with one arm operatively connected with said pivoted knife, the other arm of said lever constituting an operating handle for said lever, and a supplemental notching cutter located above and rigidly mounted on and movable with said last mentioned arm.

3. A shingle cutter having a main cutting means comprising a pivoted main knife, a pivoted arm for operating the pivoted main knife, a supplemental knife mounted on said arm, and a table member mounted on the pivot for the pivoted knife operating arm, said member being adapted to support the work in position to be engaged by said supplemental knife and constituting a cutting edge adapted to cooperate with said supplemental knife.

4. A shingle cutter comprising a stationary knife and a movable knife carrier provided with a work supporting portion, means for operating said movable knife carrier, said means including an operating arm located above said movable knife carrier, and a punch member carried by said operating arm in position to engage the work on the work supporting portion of said movable knife carrier.

5. A shingle cutter comprising a stationary knife and a movable knife carrier having a work support, means for operating said movable knife carrier, said means including an operating arm located above said knife carrier, and a punch member carried by said operating arm and adapted to engage work supported on the work support of said movable knife carrier, said operating arm being provided with an enlarged portion adapted to increase the weight thereof, said portion being located above the punch member and having a flat surface, whereby said portion is adapted to serve as an anvil.

6. A shingle cutter comprising a stationary body portion, a knife blade mounted therein, a knife carrier located above said body member and pivotally secured thereto, a knife blade mounted in said pivoted carrier for cooperation with the knife blade on said body member, means mounted on said body member operatively engaging the free end of the pivoted knife carrier to actuate the same, said means including an operating lever, and a supplemental cutting device comprising a table mounted on said shingle cutter and having an elongated slot in the top thereof, and a knife blade mounted on and movable with said lever and working in the elongated slot in said table.

7. A shingle cutter comprising a body portion, a knife carrier located above said body portion and pivotally secured thereto adjacent one end thereof, cooperating knife blades on said body member and said knife carrier, a link pivoted at its lower end to said body member adjacent to the free end of said knife carrier, an operating lever fulcrumed on the upper end of said link with one arm pivotally connected to the free end of said knife carrier with the other arm extending lengthwise of the knife carrier towards the pivoted end thereof, and a supplemental notching cutter comprising a knife blade mounted on and movable with said other arm of said lever.

8. A shingle cutter comprising a body portion, a knife carrier located above said body member and pivotally secured thereto adjacent one end thereof, cooperating knife blades on said body member and said knife carrier, an operating lever fulcrumed on said shingle cutter with one arm pivotally connected to the free end of said knife carrier with the other arm extending lengthwise of the knife carrier towards the pivoted end thereof, and a supplemental cutting device comprising a knife blade fixed to said other arm of said lever and forming one cutting edge of said device and a member mounted on said shingle cutter adapted to support the work and to constitute the other cutting edge of said supplemental cutting device.

9. A shingle cutter comprising a body portion, a knife carrier located above said body member, and pivotally secured thereto adjacent one end thereof, cooperating main knife blades on said body member and said knife carrier, an operating lever fulcrumed on said shingle cutter with one arm pivotally connected to the free end of said knife carrier with the other arm extending lengthwise of the knife carrier towards the pivoted end thereof, and a supplemental cutting device comprising a work supporting table member mounted on said shingle cutter for limited swinging movement about the fulcrum of said operating lever and having an elongated slot therein forming cutting edges, and a supplemental knife blade fixed to the operating arm of said lever and working in the elongated slot in said table, said table being provided at its free end with a leg adapted to rest upon the main knife carrier in the operative positions of the supplemental knife blade fixed to said other arm of said lever.

10. A shingle cutter comprising a body portion, a knife carrier located above said body member and pivotally secured thereto adjacent one end thereof, cooperating main knife blades on said body member and said knife carrier, an operating lever fulcrumed on said shingle cutter with one arm pivotally connected to the free end of said knife carrier and with the other arm extending lengthwise of the knife carrier towards the pivoted end of said carrier in the closed position of said knives, and a supplemental cutting device comprising a table member mounted on said shingle cutter for limited swinging movement about the fulcrum of said operating lever and having an elongated slot therein forming cutting edges and a supplemental knife blade fixed to the operating arm of said lever and working in the elongated slot in said table and cooperating with the cutting edges thereof, said table being provided at its free end with a leg adapted to rest upon the main knife carrier in the operative positions of the supplemental knife blade fixed to said other arm of said lever, and having an opening therein through which said other arm extends, said opening being large enough to permit limited movement of said other arm independently of said table.

11. A shingle cutter comprising a body portion, a knife carrier located above said body member and pivotally secured thereto adjacent one end thereof, cooperating main knife blades on said body member and said knife carrier, an operating lever fulcrumed on said shingle cutter with one arm pivotally connected to the free end of said knife carrier with the other arm extending lengthwise of the knife carrier towards the pivoted end thereof, and a supplemental cutting device comprising a table member mounted on said shingle cutter for limited swinging movement about the fulcrum of said operating lever and having an elongated slot therein forming cutting edges, and a supplemental knife blade fixed to said other arm of said lever and working in the elongated slot in said table and cooperating with the cutting edges thereof, said table being provided at its free end with a leg adapted to rest upon the main knife carrier in the operative positions of the supplemental knife blade fixed to said other arm of said lever and support the top of said table in a plane inclined upwardly towards the free end of said other arm.

12. A shingle cutter comprising a table member having an opening in the top thereof, an arm pivotally connected to said table, and a knife blade secured to said arm and working in the opening in said table said opening forming cutting edges adapted to cooperate with said knife blade.

13. A shingle cutter comprising a table having an opening in the top thereof forming cutting edges, an arm located below said table for vertical swinging movement relative thereto, and a cutting knife secured to said arm and extending upwardly through said opening, said knife having a hook-shaped upper end portion provided with a cutting edge along its underside adapted to cooperate with the cutting edges formed by said opening.

SEVERIN N. GUNDLACH.